US011934141B2

(12) United States Patent
Takagi

(10) Patent No.: US 11,934,141 B2
(45) Date of Patent: Mar. 19, 2024

(54) IMAGE FORMATION APPARATUS INCLUDING GRIP MEMBER TO BE GRIPPED DURING TRANSPORTATION

(71) Applicant: KYOCERA Document Solutions Inc., Osaka (JP)

(72) Inventor: Masaru Takagi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/017,358

(22) PCT Filed: Jul. 19, 2021

(86) PCT No.: PCT/JP2021/026960
§ 371 (c)(1),
(2) Date: Jan. 20, 2023

(87) PCT Pub. No.: WO2022/024837
PCT Pub. Date: Feb. 3, 2022

(65) Prior Publication Data

US 2023/0297020 A1 Sep. 21, 2023

(30) Foreign Application Priority Data

Jul. 27, 2020 (JP) ................................ 2020-126152

(51) Int. Cl.
*G03G 21/00* (2006.01)
*B65D 5/00* (2006.01)
(Continued)

(52) U.S. Cl.
CPC ..... *G03G 21/1647* (2013.01); *B65D 5/46072* (2013.01); *G03G 21/1619* (2013.01);
(Continued)

(58) Field of Classification Search
CPC .......... G03G 21/1619; G03G 21/1647; G03G 21/1604; G03G 2215/00004;
(Continued)

(56) References Cited

U.S. PATENT DOCUMENTS 4,589,162 A * 5/1986 Manz .................... H05K 5/023 16/429
5,961,194 A * 10/1999 Shaw .................... H05K 5/023 312/352
(Continued)

FOREIGN PATENT DOCUMENTS

JP H0623054 U 3/1994
JP 08190332 A * 7/1996
JP H08328329 A 12/1996

*Primary Examiner* — Robert B Beatty
(74) *Attorney, Agent, or Firm* — Alleman Hall & Tuttle LLP

(57) ABSTRACT

An image forming apparatus comprises a grip member, a support portion, and a housing. The support portion is provided in the housing and supports the grip member to be able to slide between a first position where the grip member is stored further inside than a side surface of the housing and a second position where the grip member protrudes outward from the side surface and can be gripped. The grip member has an upper grip portion and a lower grip portion that are separated in the up-down direction and supported by the support portion to be able to slide substantially horizontally. The image forming apparatus includes restricting mechanisms configured to restrict both grip portions from sliding toward the first position in a state in which the grip member is at the second position and an upward force is applied to at least one of the grip portions.

2 Claims, 10 Drawing Sheets

(51) Int. Cl.
*B65D 5/46* (2006.01)
*G03G 21/16* (2006.01)

(52) U.S. Cl.
CPC ............... *G03G 2221/1678* (2013.01); *G03G 2221/1681* (2013.01)

(58) Field of Classification Search
CPC ... G03G 2221/1678; G03G 2221/1681; G03G 2221/1684; B41J 29/02; H05K 5/023
USPC .................................................. 399/108, 110
See application file for complete search history.

(56) References Cited

U.S. PATENT DOCUMENTS

| | | | | |
|---|---|---|---|---|
| 6,259,872 | B1 * | 7/2001 | Fukunaga | G03G 15/00 399/110 |
| 6,834,172 | B2 * | 12/2004 | Tomita | G03G 15/00 399/108 |
| 7,106,990 | B2 * | 9/2006 | Murano | G03G 21/1633 399/108 |
| 7,469,114 | B2 * | 12/2008 | Koido | B41J 29/13 399/108 |
| 2009/0123175 | A1 * | 5/2009 | Takemoto | G03G 21/1623 399/107 |
| 2011/0064456 | A1 * | 3/2011 | Tada | G03G 21/1661 399/110 |
| 2020/0264552 | A1 * | 8/2020 | Sato | G03G 15/0142 |
| 2021/0153368 | A1 * | 5/2021 | Ye | H05K 7/1488 |

* cited by examiner

IMAGE FORMATION APPARATUS INCLUDING GRIP MEMBER TO BE GRIPPED DURING TRANSPORTATION

TECHNICAL FIELD

The present invention relates to an image forming apparatus including a grip member that is gripped during transportation and a support portion that supports the grip member.

BACKGROUND ART

Image forming apparatuses such as printers, copiers, and facsimile machines may include a grip member. The grip member is used when fixing the image forming apparatus during transportation or when moving the image forming apparatus. For example, a grip member that can be stored in a housing of an image forming apparatus (see Patent Document 1) and a detachable grip member whose mounting position can be changed (see Patent Document 2) are known.

CITATION LIST

Patent Literature

[Patent Document 1] JP H08-328329 A
[Patent Document 2] JP H06-23054 A

SUMMARY OF INVENTION

Technical Problem

However, in a case of a conventional grip member that can be stored in the housing, there are cases where the grip member moves to the storage position while the user is gripping the grip member, and pinches the user's hand. In addition, detachable conventional grip members must be stored separately when not in use. Therefore, the conventional grip member cannot be used immediately when needed, making the grip member inconvenient to use, and there is also a risk of the grip member becoming lost.

An object of the present invention is to provide an image forming apparatus having a grip member that is highly safe and excellent in usability.

Solution to Problem

An image forming apparatus according to one aspect of the present invention includes a grip member to be gripped, and a support portion configured to support the grip member. The support portion is provided in a housing of the image forming apparatus, and supports the grip member to be slidable between a first position where the grip member is stored further inside than a side surface of the housing and a second position where the grip member protrudes outward from the side surface and can be gripped. The grip member has an upper grip portion and a lower grip portion that are separated in the up-down direction and supported by the support portion so as to be able to slide substantially horizontally. The image forming apparatus includes a restricting mechanism configured to restrict both the upper grip portion and the lower grip portion from sliding toward the first position in a state in which the grip member is at the second position and an upward force is applied to at least one of the upper grip portion and the lower grip portion.

Effect of Invention

According to the present invention, it is possible to achieve a grip member that is highly safe in use and excellent in usability.

DESCRIPTION OF EMBODIMENTS

Embodiments of the present invention will be described below with reference to the accompanying drawings. The following embodiments are examples of implementing the present invention and do not limit the technical scope of the present invention. Note that in the following description, the up-down direction D1, the front-rear direction D2, and the left-right direction D3 shown in each of the drawings may be used.

Figure 1:
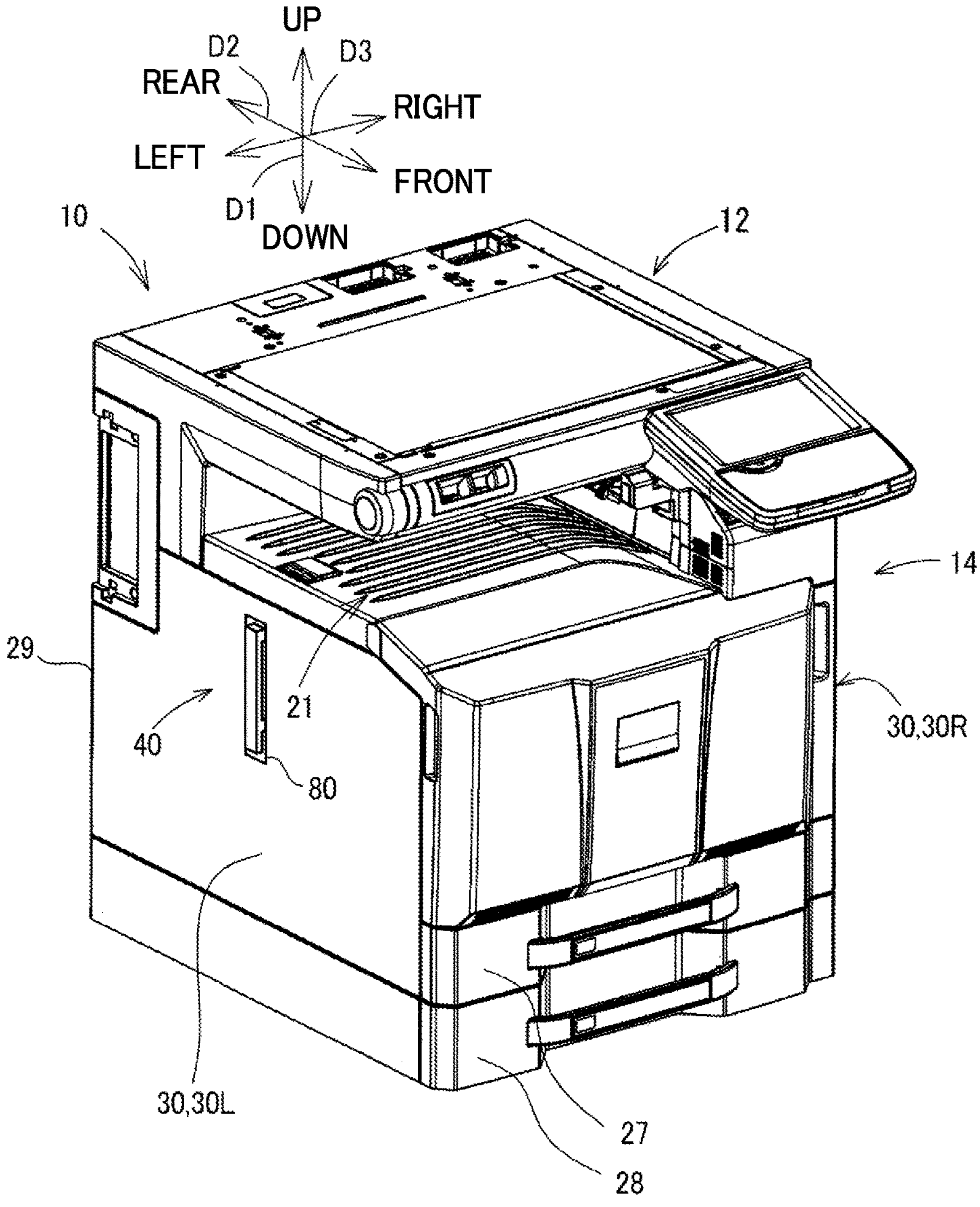
FIG. 1 is a perspective view showing a configuration of an image forming apparatus according to an embodiment of the present invention.

FIG. 1 is a perspective view showing an image forming apparatus 10 according to an embodiment of the present invention. In FIG. 1, illustration of a document sheet cover of an image reading portion 12 is omitted. The image forming apparatus 10 is an apparatus including at least a printing function. In the present embodiment, the image forming apparatus 10 is a so-called multifunction device or a multifunction peripheral including functions such as those of a printer, a copier, a facsimile machine, and a scanner. The image forming apparatus 10 is not limited to being a multifunction peripheral, and the present invention could also be applied to apparatuses such as a printer, a copier, and a facsimile machine.

As shown in FIG. 1, the image forming apparatus 10 includes an image reading portion 12 and an image forming portion 14. The image reading portion 12 performs processing for reading an image of a document sheet, and is provided at an upper portion of the image forming apparatus 10. The image forming portion 14 performs processing for forming an image based on an electrophotographic method, and is provided below the image reading portion 12. Note that the image forming portion 14 is not limited to being an electrophotographic type, and may be an inkjet recording type, or may be another recording or printing type.

The image forming portion 14 forms an image on a sheet of printing paper of a prescribed size such as A size or B size based on image data read by the image reading portion 12 or based on image data input from the outside. The image forming portion 14, according to a preset printing mode (single-sided printing mode or double-sided printing mode) performs either a single-sided printing process (single-sided image forming process) for forming an image on only one side of a sheet of printing paper, or a double-sided printing process (double-sided image forming process) for forming images on both sides of a sheet of printing paper.

Figure 2:
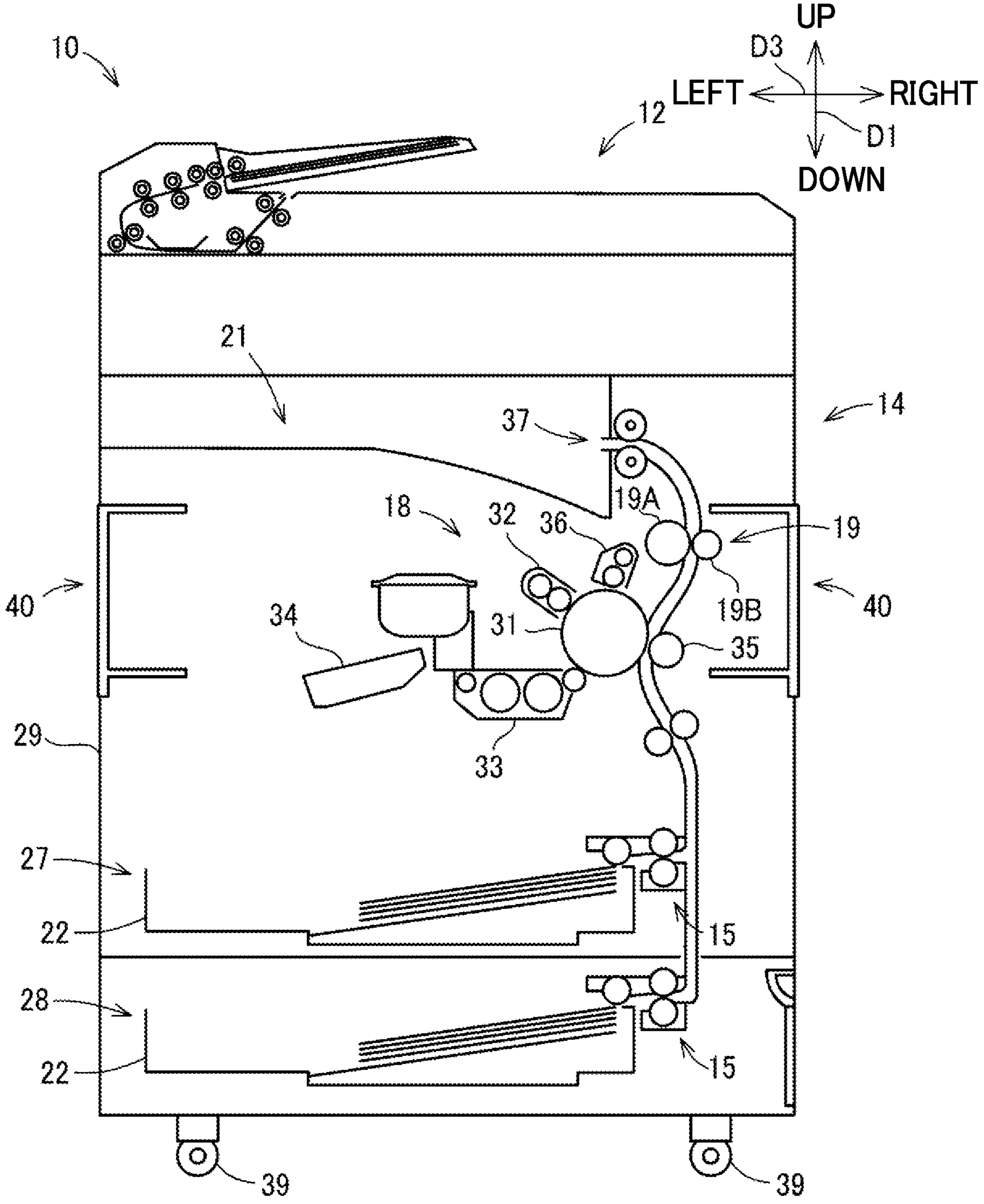
FIG. 2 is a diagram showing an internal configuration of the image forming apparatus according to an embodiment of the present invention.

FIG. 2 is a diagram showing a configuration of the image forming portion 14. As shown in FIG. 2, the image forming portion 14 mainly includes sheet feed devices 27 and 28, an electrophotographic image transfer portion 18, a fixing portion 19, and the like. These are provided inside a housing 29 that configures exterior panels of an outer frame, a cover, an inner frame and the like of the image forming portion 14.

The sheet feed devices 27 and 28 convey printing paper stored in a paper storage portion 22 toward the image transfer portion 18 by a feeding mechanism 15. Several hundred to several thousand sheets of printing paper can be stacked in the paper storage portion 22.

The image transfer portion 18 is provided above the sheet feeding device 27. The image transfer portion 18 performs an image transfer process on the printing paper conveyed from the sheet feeding devices 27 and 28 using monochromatic toner. More specifically, the image transfer portion 18 transfers a toner image onto a sheet of printing paper using a printing material such as toner based on input image data. The image transfer portion 18 includes a photoconductor drum 31, a charging portion 32, a developing portion 33, a laser scanning unit (LSU) 34, a transfer roller 35, and a cleaning portion 36.

When an image forming operation is started, the charging portion 32 charges a surface of the photoconductor drum 31 to a uniform potential. In addition, the LSU 34 scans the photoconductor drum 31 with a laser beam according to image data. Thus, an electrostatic latent image is formed on the photoconductor drum 31. After that, toner is adhered to the electrostatic latent image by the developing portion 33 to form a toner image on the photoconductor drum 31. The transfer roller 35 is arranged to face the photoconductor drum 31 across a conveying path. When a sheet of printing paper being conveyed along the conveying path passes through a nip portion between the transfer roller 35 and the photoconductor drum 31, the toner image is transferred to the sheet of printing paper by the transfer roller 35. The sheet of printing paper onto which the toner image has been transferred is conveyed along the conveying path to the fixing portion 19 arranged further on a downstream side (that is, upper side) in the conveying direction of the sheet of printing paper than the image transfer portion 18.

The fixing portion 19 includes a heating roller 19A and a pressure roller 19B, and fixes the toner image that was transferred to the sheet of printing paper to the sheet of printing paper by heat. The sheet of printing paper on which fixing of the image has been completed is discharged from a paper discharge port 37 to a discharge tray 21.

The image forming apparatus 10 is a multifunction device provided with the image reading portion 12 and the image forming portion 14, and thus even a case of being medium sized, would weigh 60 to 70 kg, and in a case of being capable of color printing, would weigh 80 to 90 kg, and some large machines may weigh more than 100 kg. Such an image forming apparatus 10 is provided with casters 39 on the bottom surface of the housing 29 so as to be easily movable on a floor after being installed in an office or the like. However, as described above, since the image forming apparatus 10 is heavy, the housing 29 of the image forming apparatus 10 is provided with a grip member 40 (an example of a grip member of the present invention) for the user to grip when moving the image forming apparatus 10.

Figure 3:
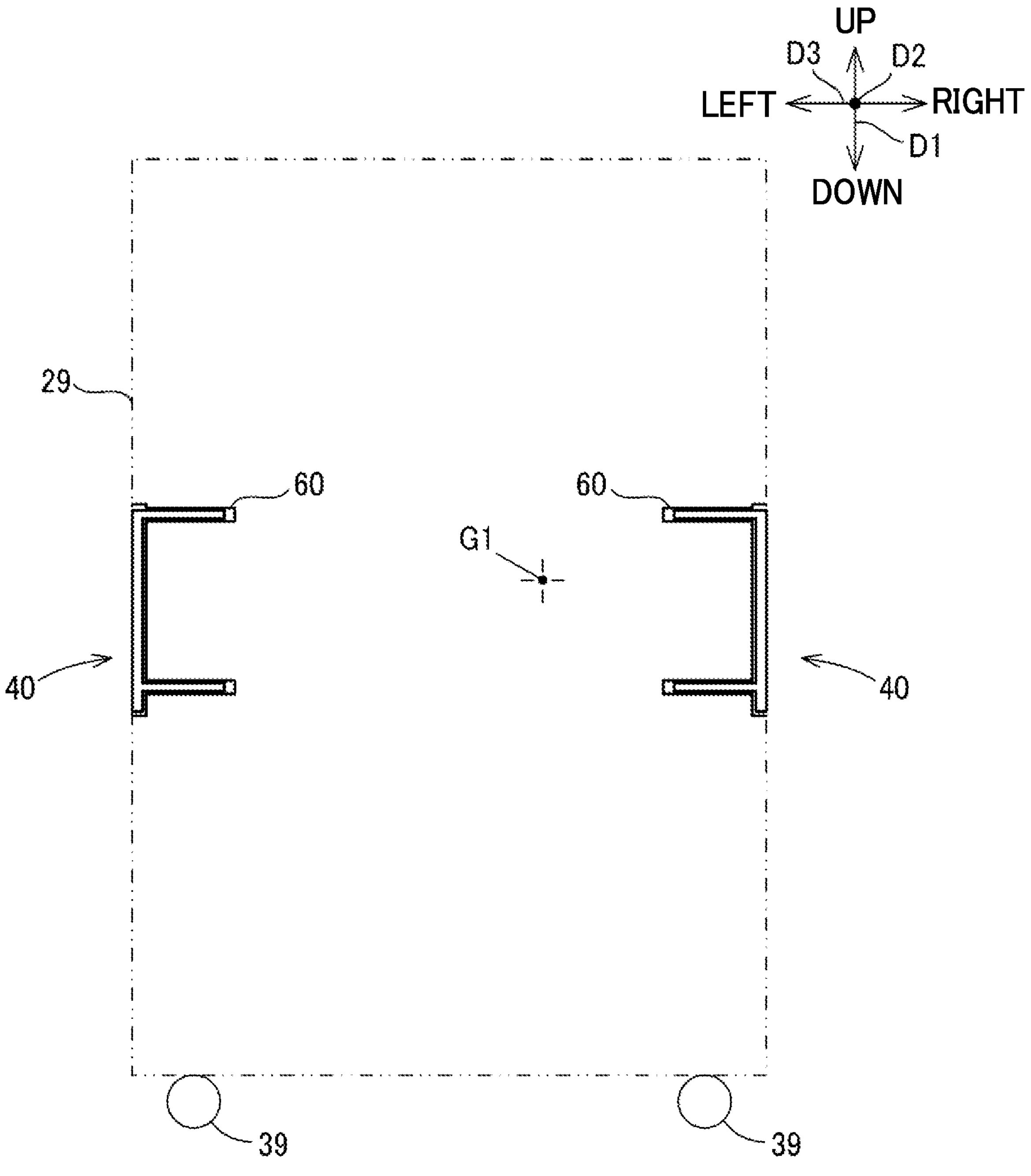
FIG. 3 is a diagram showing positions of grip members in a housing of the image forming apparatus.
Figure 4:
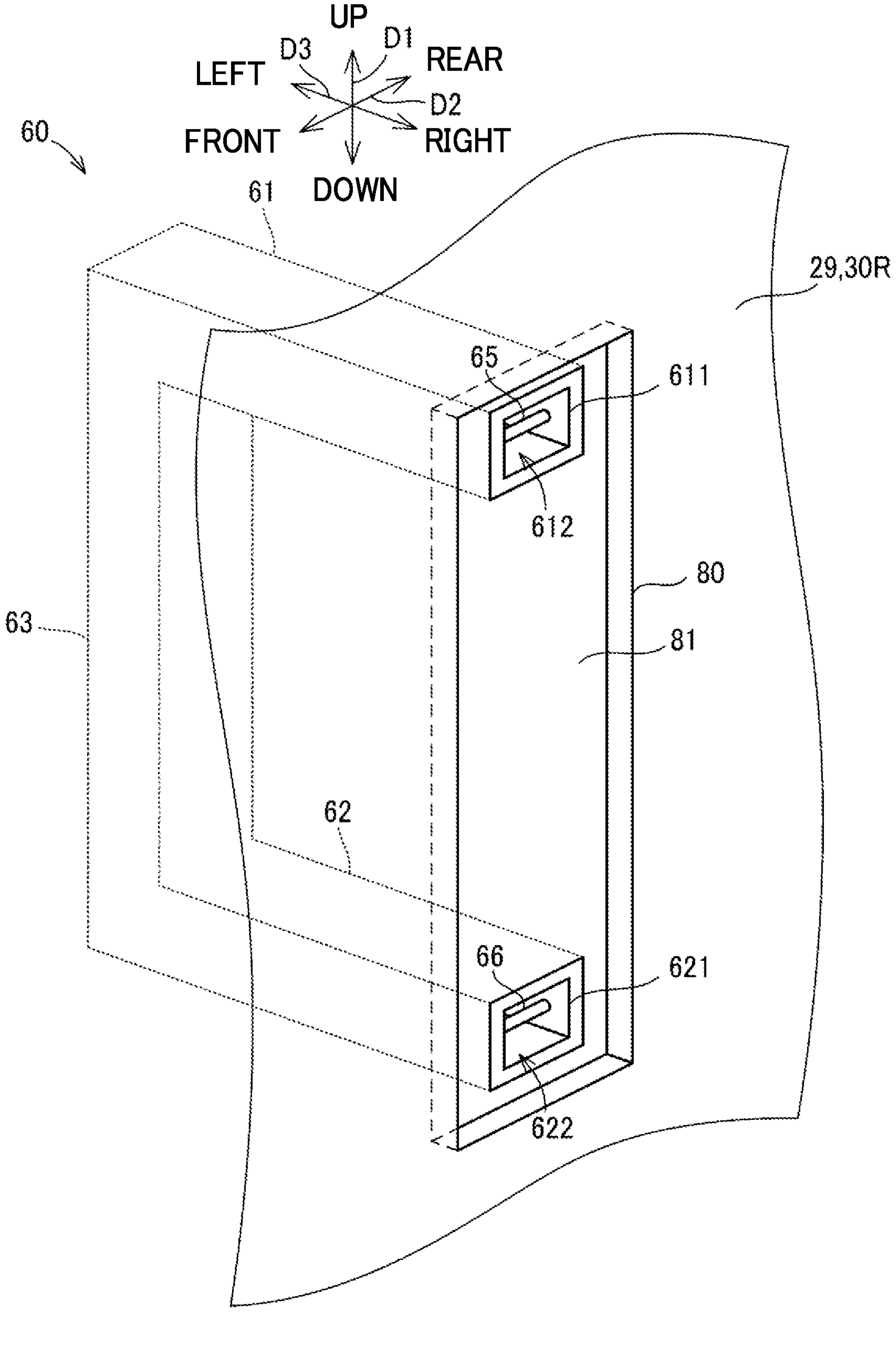
FIG. 4 is a perspective view showing a configuration of a support portion that supports the grip member.
Figure 5:
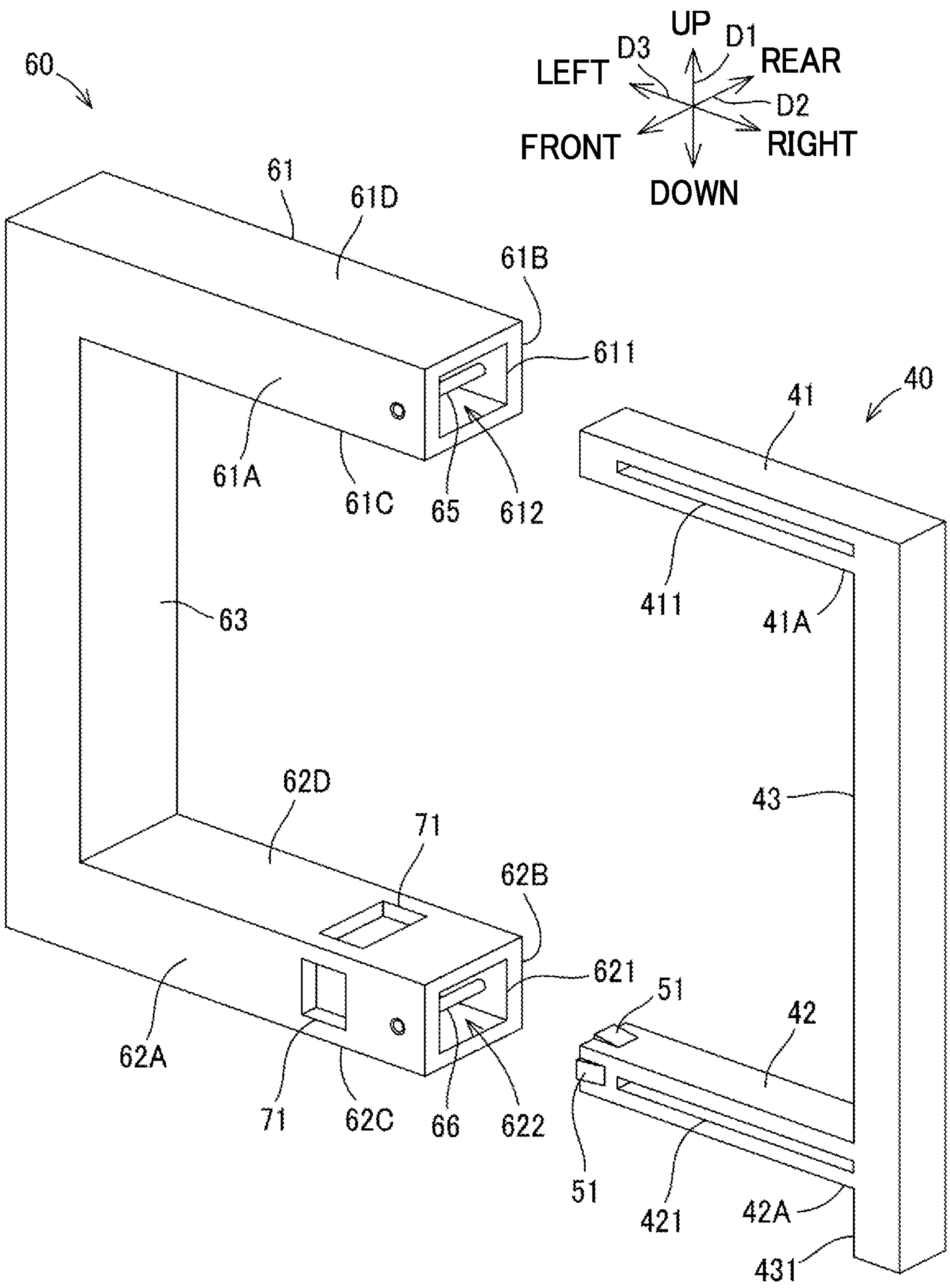
FIG. 5 is a perspective view showing the support portion and the grip member.
Figure 6:
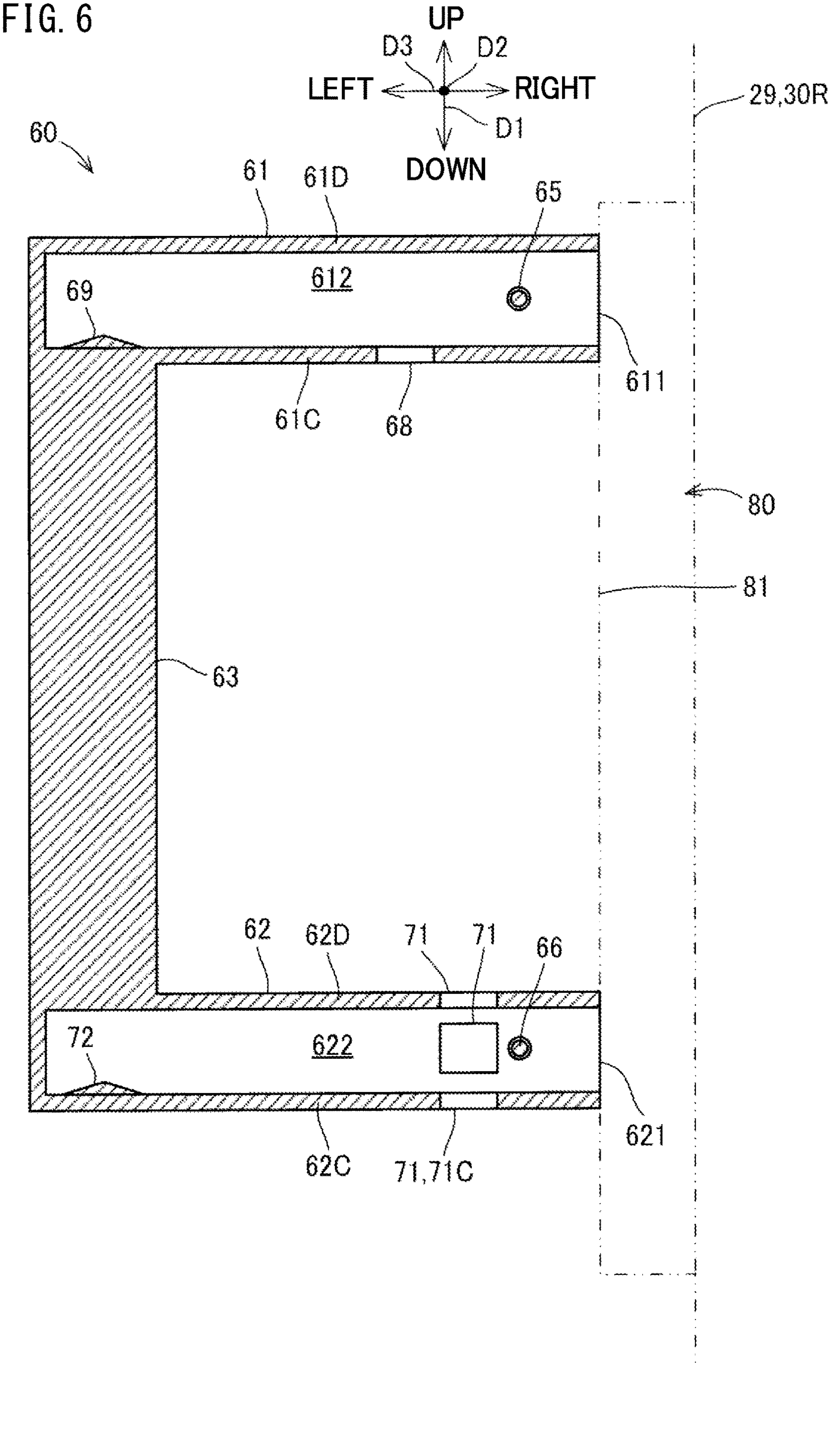
FIG. 6 is a diagram showing a cross-section of a structure of the support portion.
Figure 7:
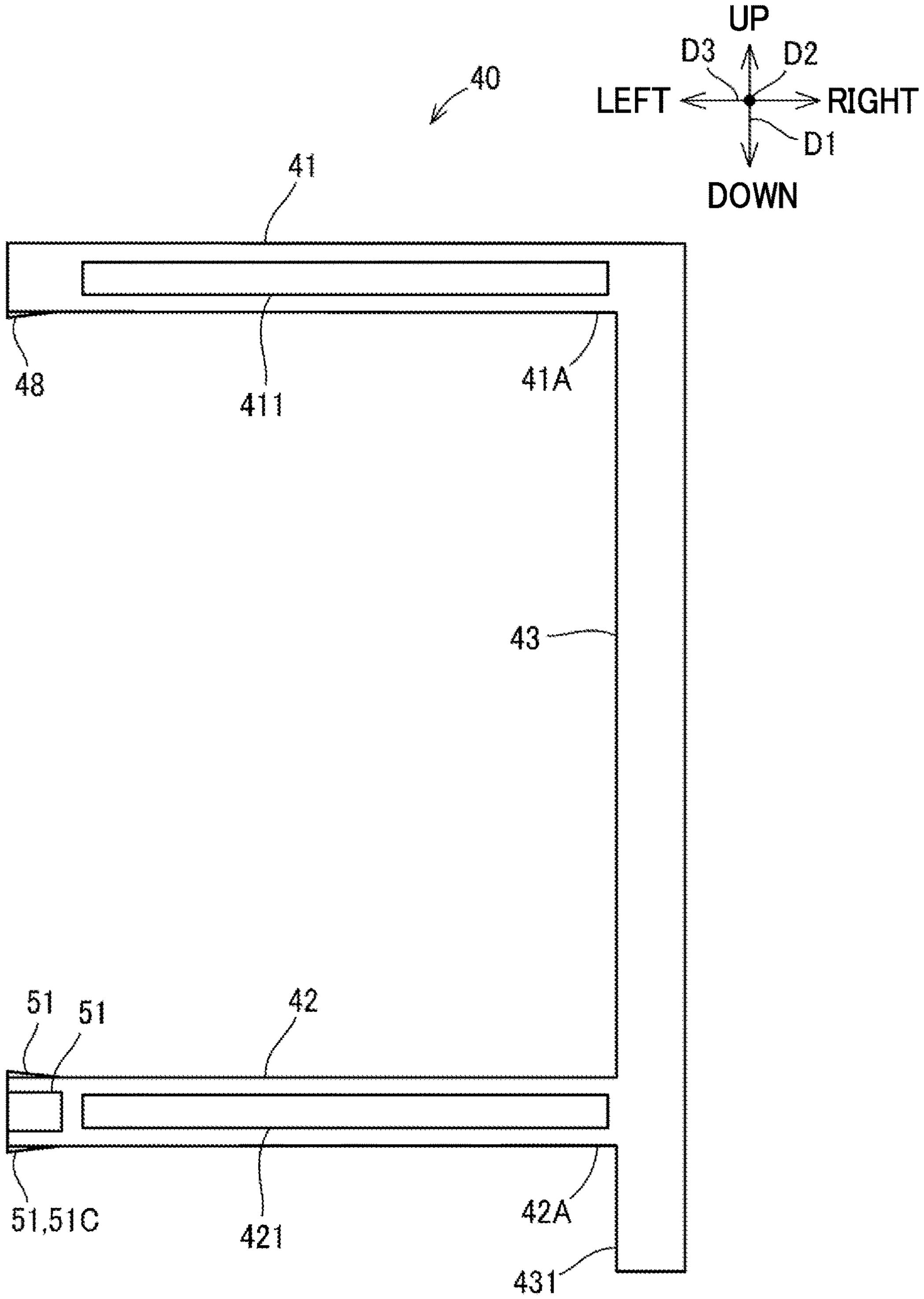
FIG. 7 is a side view showing a configuration of the grip member.
Figure 8:
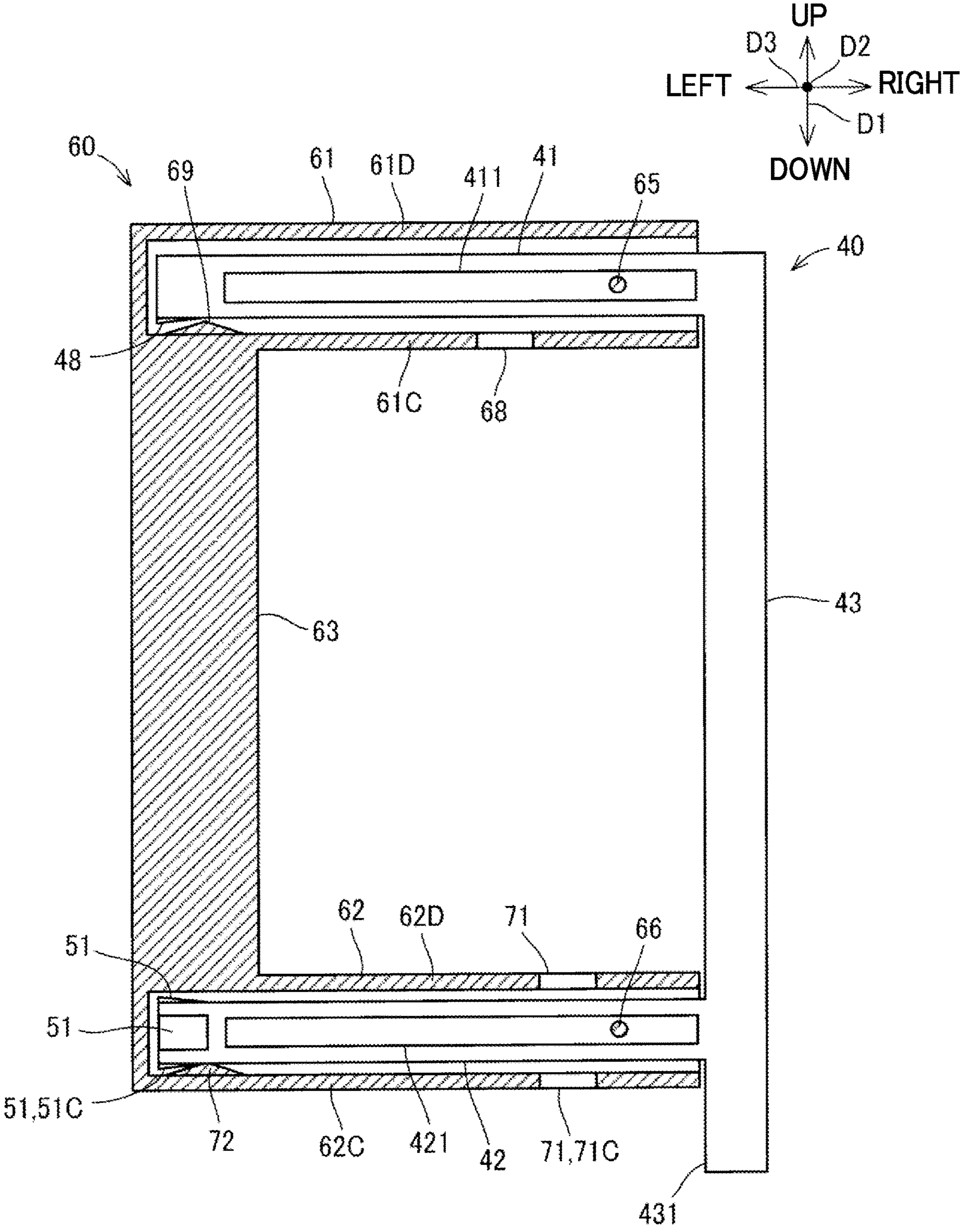
FIG. 8 is a diagram showing a state in which the grip member is housed in the support portion.
Figure 9:
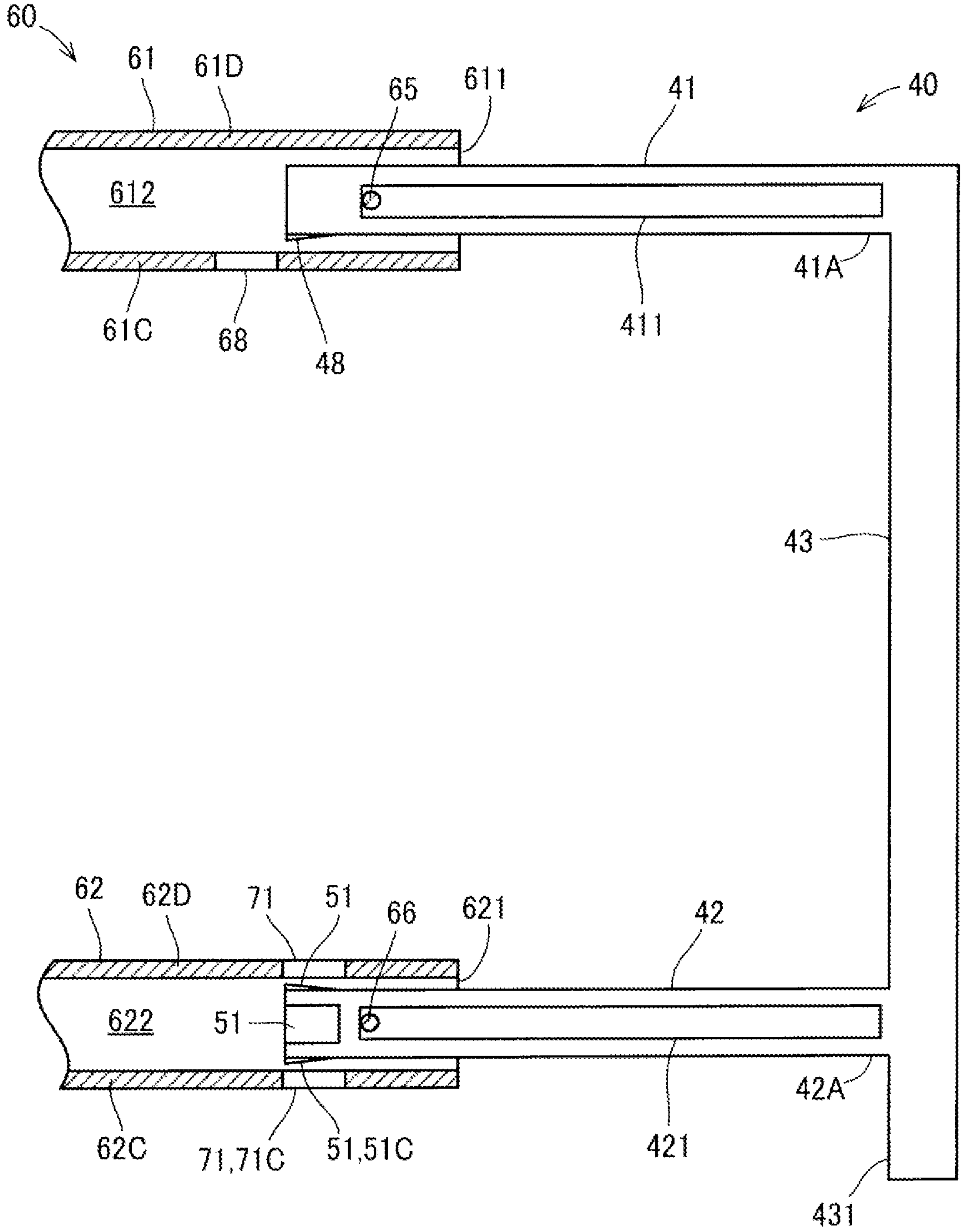
FIG. 9 is a diagram showing a state in which the grip member is pulled out to a usable position.
Figure 10:
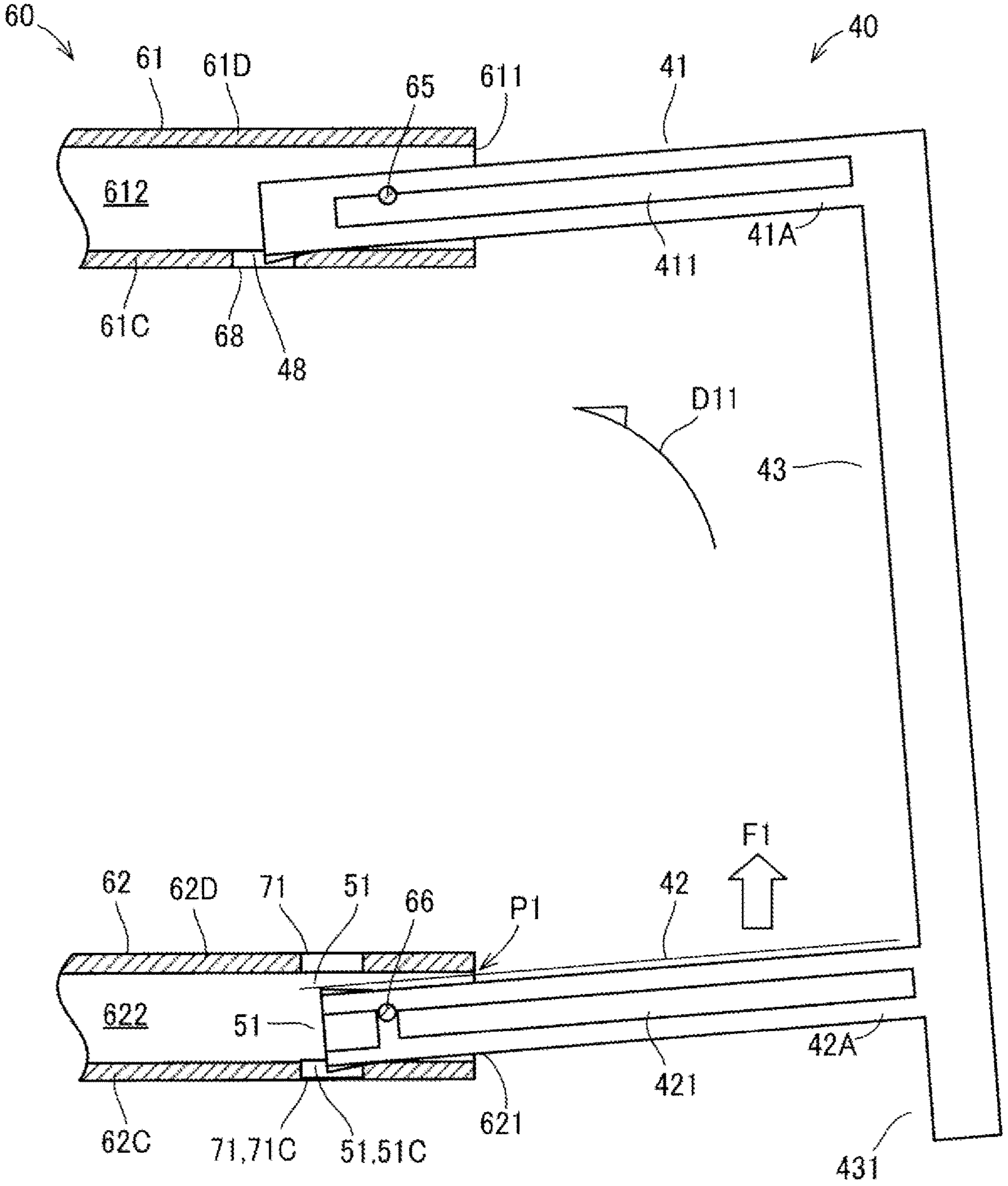
FIG. 10 is a diagram showing a state in which posture of the grip member changes when an upward force is applied to the grip member.

The grip member 40 included in the image forming apparatus 10 will be described below with reference to FIG. 3 to FIG. 10. Here, FIG. 3 is a view showing a position of grip members 40 in the housing 29 of the image forming apparatus 10; FIG. 4 is a perspective view showing a configuration of a support portion 60 that supports the grip member 40; FIG. 5 is a perspective view showing the support portion 60 and the grip member 40; FIG. 6 is a diagram showing a cross-section of the structure of the support portion 60; FIG. 7 is a side view showing a configuration of the grip member 40; FIG. 8 is a diagram showing a state in which the grip member 40 is stored in the support portion 60; FIG. 9 shows a state in which the grip member 40 is pulled out to a usable position; and FIG. 10 is a diagram showing a state in which the posture changes when an upward force is applied to the grip member 40.

FIG. 3 shows the position of the grip members 40 when the image forming apparatus 10 is viewed from the front. In FIG. 3, the outline of the housing 29 is indicated by a two-dot chain line. As shown in FIG. 3, a grip member 40 is provided on each side surface 30 (right side surface 30R and left side surface 30L) in the left-right direction D3 of the housing 29. In addition, the housing 29 is provided with a support portion 60 (an example of a support portion of the present invention) that supports the grip member 40 so as to be able to slide between a storage position (an example of a first position of the present invention) to be described later and a usable position (example of a second position of the present invention) to be described later. A grip member 40 and a support portion 60 are provided approximately in a vicinity of a center of each side surface of the housing (see FIG. 1). Note that the two grip members 40 provided on each side surface 30 have the same configuration as each other, and two support portions 60 corresponding to the grip members 40 also have the same configuration, and thus below, the configuration of the grip member 40 provided on the right side surface 30R and the support portion 60 that supports the grip member 40 will be described in detail.

FIG. 4 shows the support portion 60 provided on the right side surface 30R. The support portion 60 is made of a highly rigid member such as steel, for example. The support portion 60 is firmly fixed to a sheet metal frame or the like of the housing 29.

The support portion 60 includes a first support portion 61 that horizontally supports an upper grip portion 41 (an example of an upper grip portion of the present invention) that, as will be described later, is provided in the grip member 40, and a second support portion 62 that horizontally supports a lower grip portion 42 (an example of a lower grip portion of the present invention) that, as will be described later, is provided in the grip member 40. Both the first support portion 61 and the second support portion 62 are tubular members formed in a square tubular shape, and both extend in the horizontal direction. The support portion 60 has a base portion 63 that connects the first support portion 61 and the second support portion 62, and the base portion 63 extends in the up-down direction D1. The first support portion 61 extends to a side (to the right side) from an upper end portion of the base portion 63, and an opening 611 at the extended end portion extends to a bottom surface 81 of a rectangular recessed portion 80 formed in the right side surface 30R. In addition, the second support portion 62 extends to a side (to the right side) from a lower end portion of the base portion 63, and an opening 621 at the extended end portion extends to the bottom surface 81 of the rectangular recessed portion 80 formed in the right side surface 30R. Each opening 611, 621 is exposed at the side of the bottom surface 81.

As shown in FIG. 5, the first support portion 61 is provided with a stopper member 65. The stopper member 65 is provided so as to span an inner hole 612 of the first support portion 61 in the front-rear direction D2. The stopper member 65 is a round bar-shaped member made of steel, and is arranged in the inner hole 612 by being inserted through holes formed in a front wall 61A and a rear wall 61B of the first support portion 61. The stopper member 65 is a member that restricts sliding movement of the upper grip portion 41 inserted into the inner hole 612 and prevents the upper grip portion 41 from coming out of the first support portion 61. In this embodiment, the upper grip portion 41 is inserted into the inner hole 612 before the stopper member 65 is mounted in the first support portion 61, and in that state, the stopper member 65 is mounted in the first support portion 61. Thus, the stopper member 65 is inserted into a guide groove 411 that, as will be described later, is formed in the upper grip portion 41, and the stopper member 65 restricts the sliding movement of the upper grip portion 41.

Note that a stopper member 66 having the same configuration as the stopper member 65 is also provided in the second support portion 62. The stopper member 66, in a state of being inserted in an inner hole 622 of the second support portion 62, is inserted through a guide groove 421 formed in the lower grip portion 42. Thus, the stopper member 66 restricts sliding movement of the lower grip portion 42 and prevents the lower grip portion 42 from coming out of the second support portion 62.

As shown in FIG. 6, a rectangular engaging hole 68 (an example of an engaging recessed portion of the present invention) is formed in an inner surface (an example of a supporting surface of the present invention) of a lower wall 61C of the first support portion 61. The engaging hole 68 penetrates through the inner hole 612 of the lower wall 61C. Note that the engaging hole 68 is not limited to a through hole penetrating through the lower wall 61C, and may be, for example, a concave groove formed in the inner surface of the lower wall 61C.

The engaging hole 68 forms a part of a restricting mechanism of the present invention, and together with an engaging piece 48 that as will be described later is provided in the upper grip portion 41, forms the restricting mechanism. That is, in a case where, in a state in which the grip member 40 is in the use position and an upward force is applied to at least one of the upper grip portion 41 and the lower grip portion 42, the restricting mechanism restricts the upper grip portion 41 from sliding toward the storage position.

The engaging hole 68 is arranged at a position further inside the housing 29 (on the left side in FIG. 6) than the stopper member 65, and arranged at a position somewhat further on the right side in the left-right direction D3 than an intermediate position in the first support portion 61. The engaging piece 48 of the upper grip portion 41 is inserted into the engaging hole 68 in a case where an upward force is applied to the grip member 40. Thus, the upper grip portion 41 is prevented from sliding inward.

In addition, in a case where the upper grip portion 41 is inserted into the deep portion of the inner surface of the lower wall 61C of the first support portion 61 up to the deep side of the first support portion 61, an engaging protrusion 69 is formed in order to hold the upper grip portion 41 at that position.

As shown in FIG. 5 and FIG. 6, an engaging hole 71 (71C) having the same shape as the engaging hole 68 is formed on an inner surface (an example of the support surface of the present invention) of the lower wall 62C of the second support portion 62. In this embodiment, an engaging hole 71 is formed in each outer peripheral wall of the second support portion 62. That is, a rectangular engaging hole 71 is formed in each of a front wall 62A, a rear wall 62B, a lower wall 62C, and an upper wall 62D of the second support portion 62. Each engaging hole 71 penetrates to the inner hole 622. Note that the engaging holes 71 are not limited to being through holes penetrating the outer peripheral wall of the second support portion 62, and may be, for example, recess-shaped grooves formed on the inner surface of the outer peripheral wall.

At least the engaging hole 71C formed in the lower wall 62C forms a part of the restricting mechanism of the present invention, and together with an engaging piece 51 (51C) described later and included in the lower grip portion 42, configures the restricting mechanism of the present invention. That is, in a case where, in a state in which the grip member 40 is in the use position and an upward force is applied to at least one of the upper grip portion 41 and the lower grip portion 42, the restricting mechanism restricts the lower grip portion 42 from sliding toward the storage position.

The engaging hole 71C is arranged at a position further inside the housing 29 (on the left side in FIG. 6) than the stopper member 66, and arranged at a position somewhat further on the right side in the left-right direction D3 than an intermediate position in the second support portion 62. In a case where an upward force is applied to the grip member 40, a lower engaging piece 51C formed on the lower grip portion 42 is inserted into the engaging hole 71C. Thus, the lower grip portion 42 is prevented from sliding inward.

In addition, in a case where the lower grip portion 42 is inserted into the deep portion of the inner surface of the lower wall 62C of the second support portion 62 up to the deep side of the second support portion 62, an engaging protrusion 72 is formed in order to hold the lower grip portion 42 at that position.

As shown in FIG. 5 and FIG. 7, the grip member 40 is a portion gripped by a worker when the image forming apparatus 10 is transported or moved, and includes an upper grip portion 41 and a lower grip portion 42 separated in the up-down direction D1, and a connecting portion 43 (an example of a connecting portion of the present invention). The upper grip portion 41 and the lower grip portion 42 are portions supported by the support portion 60 so as to be slidable along the left-right direction D3, and are portions that are gripped by a worker when pulled out to the use position as will be described later. The grip member 40 is made of a highly rigid member such as steel, for example.

The connecting portion 43 is a square column-shaped member extending in the up-down direction D1. The upper grip portion 41 and the lower grip portion 42 each extend in a perpendicular direction from a side surface of the connecting portion 43. The upper grip portion 41 and the lower grip portion 42 are separated in the up-down direction D1, and a base end portion 41A of the upper grip portion 41 is connected to an upper end portion of the connecting portion 43. In addition, a base end portion 42A of the lower grip portion 42 is connected to a lower side of the connecting portion 43. In this embodiment, the connecting portion 43 has a protruding portion 431 (an example of a protruding portion of the present invention) that protrudes further downward from the base end portion 42A of the lower grip portion 42. The protruding length of the protruding portion 431 is, for example, at least equal to or greater than a thickness of a palm of the worker who grips the lower grip portion 42.

A guide groove 411 is formed in the upper grip portion 41. The guide groove 411 is a through groove that penetrates through the upper grip portion 41 in the front-rear direction D2, and is formed in a central portion in the up-down direction D1. The guide groove 411 extends in the left-right direction D3, and a height in the up-down direction D1 of the guide groove 411 is a size that allows the stopper member 65 to be inserted therein.

In addition, a guide groove 421 is formed in the lower grip portion 42. The guide groove 421 is formed in the same shape as the guide groove 411, and is a through groove that penetrates through the lower grip portion 42 in the front-rear direction D2. The guide groove 421 is formed in a central portion of the lower grip portion 42 in the up-down direction D1. The guide groove 421 extends in the left-right direction D3, and a height in the up-down direction D1 of the guide groove 421 is a size that allows the stopper member 66 to be inserted therein.

In this way, the guide groove 411 is provided in the upper grip portion 41 and the guide groove 421 is provided in the lower grip portion 42, and thus by inserting the upper grip portion 41 into the inner hole 612 of the first support portion 61 and inserting the lower grip portion 42 into the inner hole 622 of the second support portion 62, it is possible for the grip member 40 to slide between the storage position shown in FIG. 8 and the use position shown in FIG. 9. Here, the storage position is a position where the grip member 40 is stored further inside than the right side surface 30R of the housing 29. In addition, the use position is a position where the grip member 40 extends to the outside (right side) from the right side surface 30R and can be gripped by a worker.

As shown in FIG. 7, an engaging piece 48 is formed on a lower surface of a tip end portion (extending end portion) of the upper grip portion 41. The engaging piece 48 is formed in a wedge shape that is formed so that the height size increases going toward the tip end. Note that the engaging piece 48 may be formed in any size and shape as long as the size and shape do not hinder the sliding of the upper grip portion 41 inside the inner hole 612 of the first support portion 61 and allow the engaging piece 48 to be inserted into the engaging hole 68.

In addition, as shown in FIGS. 5 and 7, an engaging piece 51 having the same shape as the engaging piece 48 described above is formed on each of a lower surface, an upper surface, a front surface, and a rear surface of the tip end portion (extending end portion) of the lower grip portion 42. Note that the engaging piece 51 may be formed in any size and shape as long as the size and shape do not hinder the sliding of the lower grip portion 42 inside the inner hole 622 of the second support portion 62 and allow the engaging piece 51 to be inserted into the corresponding engaging hole 71.

In the present embodiment, the grip member 40 is arranged in the housing 29 with a center of gravity G1 (see FIG. 3) of the image forming apparatus 10 as a reference. More specifically, as shown in FIG. 3, the grip member 40 and the support portion 60 are arranged such that the upper grip portion 41 is positioned above the center of gravity G1 and the lower grip portion 42 is positioned below the center of gravity G1.

As described above, the image forming apparatus 10 of the present embodiment includes the support portion 60 that supports the grip member 40 so as to be able to slide between the storage position and the use position, and the grip member 40 includes an upper grip portion 41 and a lower grip portion 42 separated in the up-down direction D1. Therefore, as shown in FIG. 8, in a case where the grip member 40 is inserted to the storage position, the engaging piece 48 of the upper grip portion 41 rides over the engaging protrusion 69 provided in the first support portion 61 and is arranged further on the deep side. Similarly, in a case where the grip member 40 is inserted to the storage position, the engaging piece 51 provided on the lower side of the lower grip portion 42 rides over the engaging protrusion 72 provided in the second support portion 62 and is arranged further on the deep side. Thus, the upper grip portion 41 and the lower grip portion 42 are held at the storage position by an engaging force between the engaging piece 48 and the engaging protrusion 69 and an engaging force between the engaging piece 51 and the engaging protrusion 72. As a result, during non-use when the grip member 40 is not used, the grip member 40 can be slid to the storage position and held at the storage position.

In addition, when the grip member 40 is used, the worker, by applying a force in the direction of pulling out the connecting portion 43 of the grip member 40 and pulling the grip member 40 out to the use position (see FIG. 9) can use the grip member 40 when transporting or moving the image forming apparatus 10. Further, since the guide groove 411 is provided in the upper grip portion 41 and the guide groove 421 is provided in the lower grip portion 42, and since the stopper members 65 and 66 are provided in the support portion 60, when the grip member 40 is pulled out to the use position, the stopper members 65, 66 and the end portions of the guide grooves 411, 421 come in contact with each other to prevent further pulling out.

In addition, in a case where the worker grips the lower grip portion 42 of the grip member 40 and applies an upward lifting force F1, as shown in FIG. 10, the grip member 40 tries to rotate in a direction of the arrow D11 with an action point P1 at which the lower grip portion 42 and the opening 621 come in contact as a fulcrum point. Thus, the engaging piece 48 of the upper grip portion 41 is inserted into the engaging hole 68, and the lower engaging piece 51C of the lower holding portion 42 is inserted into the corresponding engaging hole 71C. As a result, even when the grip member 40 is pressed toward the storage position, the grip member 40 is prevented from sliding toward the storage position. Thus, the worker's hand gripping the lower grip portion 42 is prevented from being caught or pinched. In other words, according to the present embodiment, it is possible to achieve a grip member 40 that is highly safe and easy to use.

In addition, in a case where the worker grips the upper grip portion 41 of the grip member 40 and applies an upward lifting force, the grip member 40 tries to rotate in a direction of the arrow D11 with an action point at which the upper grip portion 41 and the opening 611 come in contact as a fulcrum point. In this case as well, the engaging piece 48 of the upper grip portion 41 is inserted into the engaging hole 68, and the lower engaging piece 51C of the lower holding portion 42 is inserted into the corresponding engaging hole 71C. As a result, even in a case where a pressing force is applied to the grip member 40 toward the storage position, the grip member 40 is prevented from sliding toward the storage position.

Note that as described above, in the present embodiment, both the upper grip portion 41 and the lower grip portion 42 prevent sliding movement toward the storage position, and thus it is possible to achieve an extremely high degree of safety as compared with a grip member having a conventional structure.

In addition, in the embodiment described above, engaging holes 71 are also formed in the front wall 62A, the rear wall 62B, and the upper wall 62D of the second support portion 62, and engaging pieces 51 corresponding to the engagement holes 71 are provided at the tip end portion of the lower grip portion 42. Therefore, for example, in a case where a forward force, a rearward force, or a downward force is applied to the grip member 40, one of the engaging pieces 51 is inserted into an engaging hole 71, preventing the lower grip portion 42 from sliding toward the storage position.

In addition, in the present embodiment, the upper grip portion 41 can be used as a suspension hook. That is, when the worker lifts the image forming apparatus 10 by a crane or the like, the upper grip portion 41 can be used as a hook for passing a wire rope.

Note that in the embodiment described above, in a case where an upward force F1 is applied to the lower grip portion 42, the amount of rotation (the amount of movement in the direction of the arrow D11) of the upper grip portion 41 far from the point of action P1 is greater than the amount of rotation of the lower grip portion 42 near to the point of action P1. Therefore, the engaging hole 68 is arranged at a position slightly further inside (the inner side of the housing 29) than the engaging hole 71C, and the height of the inner hole 612 of the first support portion 61 is slightly larger than the height of the inner hole 622 of the second support portion 62. Note that the shapes of the engaging hole 68 and the engaging holes 71C are not limited to those of the embodiment described above and need only be arranged at positions where the engaging pieces 48 and 51C can be inserted in a case where an upward force is applied to the grip member 40.

In addition, in the embodiments described above, an example of a configuration in which one engaging hole 68 is formed in the first support portion 61 and one engaging piece 48 is provided in the upper grip portion 41 is described; however, it is possible, for example, as in the case of the second support portion 62 and the lower grip portion 42, to form a plurality of engaging holes 68 in the first support portion 61 and provide a plurality of engaging pieces 68 in the first support portion 61.

The invention claimed is:

1. An image forming apparatus, comprising:

a grip member, and a support portion configured to support the grip member; wherein the support portion is provided in a housing of the image forming apparatus, and supports the grip member so as to be able to slide between a first position where the grip member is stored further inside than a side surface of the housing and a second position where the grip member protrudes outward from the side surface and can be gripped;

the grip member has an upper grip portion and a lower grip portion separated in an up-down direction and supported to be able to slide horizontally, and comprises a restricting mechanism configured to restrict both the upper grip portion and the lower grip portion from sliding toward the first position in a state in which the grip member is at the second position and an upward force is applied to at least one of the upper grip portion and the lower grip portion;

the grip member has a connecting portion extending in the up-down direction and configured to connect base end portions of the upper grip portion and the lower grip portion; and the connecting portion has a protruding portion configured to protrude further downward from the base end portion of the lower grip portion.

2. An image forming apparatus, comprising:

a grip member, and a support portion configured to support the grip member; wherein the support portion is provided in a housing of the image forming apparatus, and supports the grip member so as to be able to slide between a first position where the grip member is stored further inside than a side surface of the housing and a second position where the grip member protrudes outward from the side surface and can be gripped;

the grip member has an upper grip portion and a lower grip portion separated in an up-down direction and supported to be able to slide horizontally, and comprises a restricting mechanism configured to restrict both the upper grip portion and the lower grip portion from sliding toward the first position in a state in which the grip member is at the second position and an upward force is applied to at least one of the upper grip portion and the lower grip portion; and the upper grip portion is arranged above a center of gravity of the image forming apparatus, and the lower grip portion is arranged below the center of gravity.

* * * * *